Dec. 24, 1940.                B. MILLER                 2,225,959
               PROCESS FOR DEHYDRATING NATURAL GAS
                       Filed July 20, 1937
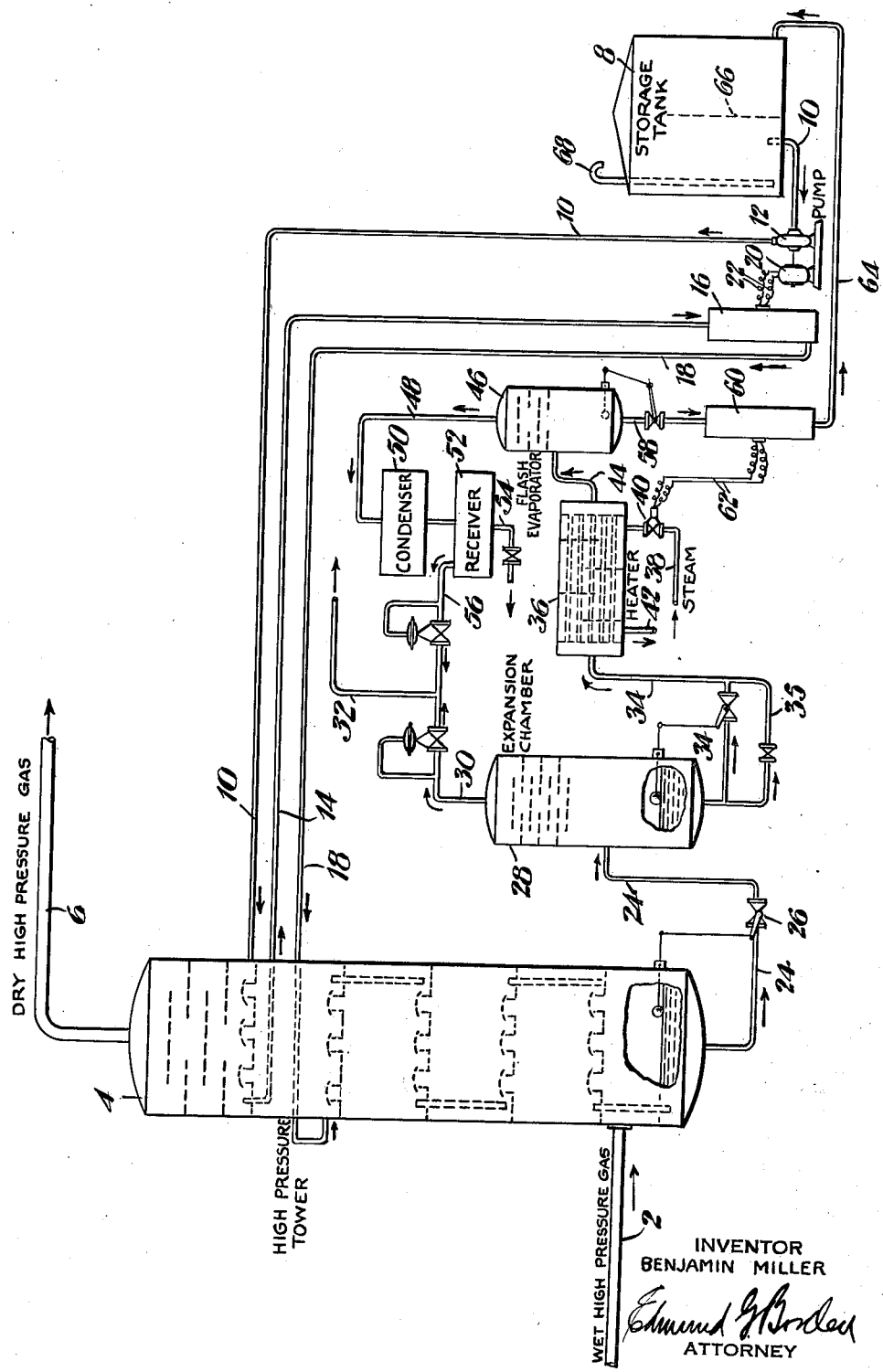
INVENTOR
BENJAMIN MILLER
ATTORNEY Patented Dec. 24, 1940

2,225,959

UNITED STATES PATENT OFFICE 2,225,959

PROCESS FOR DEHYDRATING NATURAL GAS

Benjamin Miller, Richmond Hill, N. Y., assignor to Power Patents Company, Hillside, N. J., a corporation of Maine Application July 20, 1937, Serial No. 154,668

6 Claims. (Cl. 183—121)

This invention relates to a process for dehydrating natural gas and more particularly to a process applied to the dehydration of high pressure gas being transmitted through long gas lines.

In the transmission of natural gas over long distances difficulties have been encountered because of the freezing of the moisture or the formation of other solids in the line. In transmission lines of this character pressures of several hundred pounds per square inch are maintained and considerable difficulty has arisen because of the formation of solid hydrocarbon hydrates as well as ordinary ice particles.

Many attempts have been made to prevent the formation of ice and the freezing up of gas transmission lines. For example, alcohol has been introduced into the line in the winter time but this practice has been found to be expensive. The gas passed through such transmission lines has also been dehydrated with and without the use of refrigerating equipment. Glycerine and diethylene glycol have been used as dehydrating agents, but a relatively large amount of these agents must be circulated in contact with the gas and very concentrated solutions must be used, that is, solutions which contain very little water.

In certain instances where refrigeration had been relied upon for removing the moisture from the gas the refrigerating coils or surfaces soon became coated with solid so that it has been necessary to wash such surfaces with dilute calcium chloride solutions which however are not relied upon to effect any dehydration. The dehydration in this case is accomplished entirely by the low temperatures.

Attempts have also been made to dehydrate the high pressure gas to be transmitted in gas lines by passing the gas in contact with cold calcium chloride brine so that the moisture is removed by refrigeration and picked up by the brine solution. In this operation, however, a high rate of recirculation has been found necessary in order to maintain the low temperatures.

The primary object of the present invention is to provide a process which will avoid the difficulties involved in present processes for removing excess moisture from the gas and which will avoid the necessity of cooling the gas to refrigeration temperatures.

A further object of the invention is to provide a process which will avoid the expensive practice of introducing compounds into the gas line to prevent freezing.

Another object of the invention is to provide a process which can be carried out at ordinary temperatures and which will therefore not involve the expense of changing the temperature of the gas to be dehydrated.

With these and other objects in view the process of the present invention comprises the contacting of the gas to be dehydrated in a series of zones at ordinary temperature with a dehydrating agent having a low water vapor pressure which will remain low or rise only gradually as the water concentration in the agent increases. A salt solution, for example zinc chloride containing dissolved zinc oxide has been found satisfactory. The solution is passed through the series of zones countercurrent to the gas flowing therethrough so that the gas comes in contact with a progressively less dilute solution. The process also includes the removal of the dilute solution from the first contacting zone and its reconcentration and introduction into the last contacting zone. The invention also includes certain preferred operating steps such as the automatic control of the character of the solution introduced into the last contacting zone.

Having in mind the foregoing features and objects of the invention, the improved process will be described more in detail in connection with the accompanying drawing in which:

The figure is a diagrammatic showing of apparatus elements adapted to carry out the improved process of the present invention.

Referring to the drawing, the wet or moist natural gas to be dehydrated is passed at the gas line pressure of several hundred pounds per square inch (for example 450 lbs.) through a line 2 and introduced into the lower part of a large contact tower 4 which may be of the bubble tray type illustrated in the drawing. The gas enters the lower part of the tower 4 below the bottom contact tray and then passes upwardly through the tower through a series of contact zones provided by the several trays. The upper part of the tower contains a plurality of baffle plates for the purpose of eliminating any entrained particles of liquid which may be carried by the gas from the last contact zone. The relatively dry gas is conducted from the tower 4 through a gas line 6 from which it is conducted to the main gas line for transmission or distribution.

The concentrated salt solution used in the tower 4 is withdrawn from a storage tank 8 and conducted through a line 10, in which is mounted a pump 12, onto the upper contact tray in the tower 4. The salt solution contained in the storage tank 8 preferably has a substantially constant density which may be used as a measure of its concentration. This density is that desired for the top tray in the tower 4 so that the gas passing therethrough will contain not more than a predetermined maximum of moisture. The top contact tray of the tower 4 is preferably used as a control tray to determine the rate at which the salt solution is introduced from the storage tank 8. Accordingly the solution is discharged from the line 10 onto the tray at one side of the tower 4 and removed through an overflow and line 14 on the opposite side of the tray. A portion or all of the salt solution on the top tray may be withdrawn through line 14 and passed through a density recording and control instrument 16 and then through a line 18 back into the tower 4 onto the next lower tray.

The pump 12 for passing salt solution to the tower 4 is operated by means of a motor 20 which in turn is controlled by the density control instrument 16 through connecting lines 22. Such density control instruments as 16 are well-known and in the present instance this instrument is used to vary the rate at which the salt solution is delivered to the tower through the line 10 in accordance with any variation or change in the density of the salt solution by the gas contact on the upper tray in the tower 4. For example, if the density decreases below approximately the density of the solution introduced onto the tray, the rate of delivering the solution by the pump 10 is increased automatically by the functioning of the density control device 16.

The pump 12 is set to be normally operated at a relatively low speed, but sufficiently rapid to supply solution to the upper tray in the tower 4 at such a rate that there will be substantially no water removed from the gas by the solution on this tray. The upper contact tray therefore becomes a buffer which is adapted to take up any fluctuation in the moisture content of the gas which may not have been removed by the contacts on the lower trays. These provisions insure a sufficiently dry gas in the line 6.

The salt solution reintroduced through the line 18 flows alternately across the trays and from tray to tray downwardly through the tower until it reaches the bottom after removing the desired amount of moisture from the gas. The relatively dilute salt solution is collected in the bottom of the tower 4 to a certain constant level as indicated, and removed therefrom through a line 24 provided with a float control pressure reducing valve 26. The pressure reduction through the valve 26 may be from several hundred pounds maintained in the tower 4, to 10 or 15 pounds per square inch above atmospheric at which pressure the solution is discharged into an expansion chamber 28 provided in its upper portion with entrainment elimination baffles as shown.

The gas absorbed in the salt solution is separated out in the expansion chamber 28 and removed through an automatic pressure valve controlled line 30 and discharged into a low pressure gas line 32. The chamber 28 is also provided with a liquid level controlled line 34 for withdrawing solution which is to be reconcentrated and used again in the process. A valved bypass line 35 is provided around the valve in line 34 for bleeding a continuous stream from the chamber 28, the float valve taking care of the excess. This solution is passed through the line 34 into a heater 36 which may be a tubular steam heater substantially as shown. Steam for heating the solution in the heater 36 is passed from any suitable source through a line 38 controlled by an automatic valve 40. The exhaust steam is discharged from the heater 36 through a line 42. As the relatively dilute solution passes through the tubes of the heater 36 it is heated to a temperature adapted to vaporize the excess water and increase the gravity of the solution to that desired for the process.

The hot solution is conducted from the heater 36 through a line 44 into a flash evaporator 46 in which the excess moisture is removed and discharged through a vapor line 48 to a condenser 50 and a receiver 52. The water condensed in condenser 50 and collected in receiver 52 is discharged through a valved line 54 while any gas which may have been present in the heated solution and also removed through the vapor line 48 is discharged from the receiver 52 through a pressure valve controlled line 56 into the low pressure gas line 32. The low pressure gas may be burned to generate the steam or to supply heat directly to the heater 36.

The salt solution collected in the flash evaporator 46 and having the desired gravity is discharged through a float valve controlled line 58 and then conducted on through a density recording and control instrument 60 which is similar to the instrument 16 described above. A cooler may be be placed in the line 58 if desired, but the instrument 60 automatically eliminates the effect of any temperature change on the density determination. The density control instrument 60 is used for the purpose of recording the density of the solution removed from the flash evaporator 35 and for controlling the quantity of steam discharged through the valve 40. The control valve 40 is automatically controlled through the lines 62 by the density control instrument 60. As the density of the solution passing through the instrument 60 tends to fall, the valve 40 is operated to increase the quantity of hot steam supplied to the heater 36 to in turn raise the temperature of the solution and thereby increase the gravity of the solution discharged through the line 58. The higher the temperature in the heater 36 the greater the proportion of water which will be vaporized in the flash evaporator 46.

The solution leaving the control instrument 60 is conducted through a line 64 into the storage tank 8 for reuse in the process. The storage tank 8 is preferably a closed tank which may be provided with an overflow dam or partition 66 so that the composition of the solution removed from the tank will be averaged and will not be a solution which has been immediately delivered through the line 64. The tank 8 is also provided with a line 68 through which the tank may be supplied with fresh solution or through which it may be emptied or gauged. The tank is also preferably provided with a gas vent (not shown).

In carrying out the process of the present invention, the dehydrating agent such as the zinc chloride salt solution introduced to the top contact tray of the tower 4 may for example have a concentration of approximately 70% and a density of about 1.97 at 75° F., whereas the gas entering the tower may be brought in contact with a solution on the bottom contact tray containing approximately 50% zinc chloride. Ordinarily the water content of natural gas available from the gas transmission line will contain from 30 to 50 pounds of water per million cubic feet of gas at 75° to 80° F.

The dehydration effected by the process of the present invention may be sufficient to make the gas discharged through the line 6 so dry that there will be no danger from the freezing of the small proportion of moisture left in the gas or from the formation of hydrocarbon hydrates. A water content of approximately seven pounds per million cubic feet of gas has been found sufficiently low for most of the conditions encountered in operation.

The zinc chloride solution introduced into the tower 4 through the line 10 may have a concentration of from 65% to 75% and preferably contains sufficient zinc oxide to make a substantially saturated solution of zinc oxide at temperatures somewhat below that actually employed in the operation. The zinc oxide inhibits corrosion by the solution.

The use of a zinc chloride dehydrating solution of substantially the composition referred to has been found particularly advantageous because it is unnecessary to use extremely concentrated solutions. A solution of zinc chloride of about 65% concentration has a very low water vapor pressure which increases only gradually, and not abruptly, as the water content of the solution increases. Other solutions such as sulfuric acid and phosphoric acid have approximately these same characteristics, but of course are much less desirable because of their corrosiveness and other undesirable characteristics. Lithium chloride might also be used instead of zinc chloride but of course it is much more expensive and would not be used where zinc chloride is available under present conditions. A high flow rate is not necessary with the zinc chloride and other solutions in which the water vapor pressure increases only gradually.

Solutions of calcium chloride and magnesium chloride are known to have a dehydrating effect but in the present process they are entirely unsuitable because the water vapor pressures of their saturated solutions are too high at ordinary temperatures. Glycerine and the glycols are also good dehydrating agents when they are concentrated to 90% to 92%, but their water vapor pressures rise too rapidly on the absorption of relatively small proportions of water so that they are undesirable for the process. These substances furthermore are heat sensitive and require too much care to concentrate to 90%.

The process of the present invention is particularly economical and requires very little attention because of its automatic features of control. The process is so carried out that practically all of the excess moisture is removed from the gas before it reaches the last contact zone. The contact tower may be made in any convenient size and in fact may be duplicated so that two or more towers are operated in parallel from the same supply and control equipment as illustrated in the drawing.

It is to be understood that the process of the present invention may be applied to the dehydration of natural gas or other similar gas containing undesirable moisture. The process is particularly applicable to the removal of moisture from high pressure gases containing hydrocarbons.

Having thus described the invention in its preferred form, what is claimed as new is:

1. The process of dehydrating gases containing hydrocarbons and undesirable moisture, which comprises passing the gas to be dehydrated at a substantial superatmospheric pressure through a series of zones in intimate contact with a dehydrating agent comprising a liquid zinc chloride solution having a relatively low water vapor pressure which increases only gradually upon the absorption of water from the gas, supplying the dehydrating solution having a predetermined substantially constant concentration to the last contacting zone of the series, passing the dehydrating agent through said series of zones countercurrent to the passage of gas therethrough so that the gas is brought into intimate contact with a dehydrating agent of progressively increasing capacity for the absorption of water from the gas, effecting said contact between the gas and the dehydrating agent at the prevailing atmospheric temperatures and without substantially changing the temperature of the gas or the solution during the contacting operation, and controlling the rate at which the dehydrating agent is supplied to the last contacting zone in accordance with the change in gravity between the agent supplied to said zone and the agent removed therefrom after contact with said gas and passed to the next contacting zone.

2. The process of dehydrating natural gas and similar gases containing undesirable moisture, which comprises passing the gas to be dehydrated through a series of contact zones in intimate contact with a solution of zinc chloride, introducing said solution containing from 65% to 75% of zinc chloride and having a predetermined substantially constant concentration into the last contacting zone of the series and passing it successively therethrough in intimate contact with the gas whereby the undersired moisture content of said gas is taken up by said solution, effecting said contact between the gas and the solution at the prevailing atmospheric temperatures and without substantially changing the temperature of the gas or the solution during the contacting operation, and controlling the rate at which the solution is supplied to the last contacting zone in accordance with the change in gravity between the solution introduced to said zone and the solution removed therefrom after contact with said gas and conducted to the preceding contacting zone.

3. The process of dehydrating natural gas and similar gases containing undesirable moisture as defined by claim 2 in which the countercurrent contacting operation in the series of zones is controlled so that substantially all of the moisture to be removed from the gas in the operation is absorbed in the dehydrating salt solution prior to the passage of the gas through the last contacting zone.

4. The process defined by claim 2 in which at least a portion of the solution brought in contact with the gas in the last contacting zone of the series is removed and compared in density with the solution supplied to said zone, and varying the rate at which the dehydrating solution is supplied to said last contacting zone in accordance with the change in gravity of the solution passed therethrough.

5. The process of dehydrating natural gas which comprises passing the gas containing moisture at relatively high pressure through a series of zones countercurrent to and in intimate contact with a dehydrating salt solution of progressively increasing concentration which is passed through said zones, removing the desired proportion of moisture from said gas by means of said salt solution, effecting said contact between the gas and the solution at the prevailing atmospheric temperature conditions and without positively changing the temperature or pressure of the gas or the temperature of the solution during the contacting operation, supplying a dehydrating salt solution having a predetermined substantially constant concentration to the last contacting zone of the series, and controlling the rate at which the solution is supplied to said last contacting zone in accordance with the change in gravity between the solution supplied to said zone and the solution removed therefrom after contact with said gas passing therethrough.

6. The process of dehydrating natural gas as defined by claim 5, in which the countercurrent contacting operation in the series of zones is controlled so that substantially all of the moisture to be removed from the gas in the operation is absorbed in the dehydrating salt solution prior to the passage of the gas through the last contacting zone.

BENJAMIN MILLER.